(12) United States Patent
Zhang

(10) Patent No.: US 9,428,169 B2
(45) Date of Patent: Aug. 30, 2016

(54) ELECTRIC BRAKE BOOSTER

(71) Applicant: Bosch Automotive Products (Suzhou) Co., Ltd., Suzhou, Jiangsu (CN)

(72) Inventor: Qiusheng Zhang, Jiangsu (CN)

(73) Assignees: Bosch Automotive Products (Suzhou) Co., Ltd., Suzhou, Jiangsu (CN); Robert Bosch GmbH, Stuttgart (DE)

( * ) Notice: Subject to any disclaimer, the term of this patent is extended or adjusted under 35 U.S.C. 154(b) by 241 days.

(21) Appl. No.: 14/362,548

(22) PCT Filed: Dec. 5, 2012

(86) PCT No.: PCT/CN2012/085918
§ 371 (c)(1),
(2) Date: Jun. 3, 2014

(87) PCT Pub. No.: WO2013/083039
PCT Pub. Date: Jun. 13, 2013

(65) Prior Publication Data
US 2014/0331666 A1    Nov. 13, 2014

(30) Foreign Application Priority Data

Dec. 5, 2011  (CN) .......................... 2011 1 0397940

(51) Int. Cl.
*B60T 13/74* (2006.01)
(52) U.S. Cl.
CPC .................................. *B60T 13/745* (2013.01)
(58) Field of Classification Search
CPC .............................. B60T 13/745; B60T 7/042
USPC ........................................................ 60/545
See application file for complete search history.

(56) References Cited

U.S. PATENT DOCUMENTS 4,812,723 A * 3/1989 Shimizu ................ B60T 13/745
                                                     303/114.1
6,634,724 B2 * 10/2003 Kobayashi ............ B60T 8/3265
                                                     188/1.11 E (Continued)

FOREIGN PATENT DOCUMENTS

CN          1436134 A      8/2003
CN        102015397 A      4/2011

(Continued)

OTHER PUBLICATIONS

International Search Report corresponding to PCT Application No. PCT/CN2012/085918, mailed Mar. 14, 2013 (English language document) (3 pages).

*Primary Examiner* — Thomas E Lazo
(74) *Attorney, Agent, or Firm* — Maginot, Moore & Beck LLP

(57) ABSTRACT

An electric brake booster for a vehicle brake system includes a push bar configured to be driven by a brake pedal to move forwards in an axial direction; a brake force outputting element configured to be pushed forwards by the push bar to output a brake force from the brake pedal; a booster force outputting element for outputting a booster force; a motor for driving the booster force outputting element to create the booster force; a poppet configured to be pushed forwards in the axial direction by the push bar with a spring force, wherein the poppet forms a boost switch, through which an electrical current can pass, with the brake force outputting element and forms a release switch, through which another electrical current can pass, with the booster force outputting element; and an electronic control unit for controlling the operation of the motor in responsive to the on-off states of the boost switch and the release switch. The electric brake booster is independent of the vacuum degree of the inlet pipe of the vehicle engine and can provide active and precise control to the actions of the booster.

10 Claims, 5 Drawing Sheets

(56) References Cited

U.S. PATENT DOCUMENTS

| | | |
|---|---|---|
| 6,758,041 B2 | 7/2004 | Bishop et al. |
| 8,167,383 B2 * | 5/2012 | Nishino .................. B60T 7/042 188/355 |
| 8,783,792 B2 * | 7/2014 | Vollert .................. B60T 13/745 303/113.3 |

| | | |
|---|---|---|
| 2004/0050045 A1 | 3/2004 | Bishop et al. |

FOREIGN PATENT DOCUMENTS

| | | |
|---|---|---|
| CN | 202320276 U | 7/2012 |
| JP | 2008-081033 A | 4/2008 |
| JP | 2009-208523 A | 9/2009 |

* cited by examiner

ELECTRIC BRAKE BOOSTER

This application is a 35 U.S.C. §371 National Stage Application of PCT/CN2012/085918, filed on Dec. 5, 2012, which claims the benefit of priority to Serial No. CN 2011 103 97940.5, filed on Dec. 5, 2011 in China, the disclosures of which are incorporated herein by reference in their entirety.

TECHNICAL FIELD

The invention relates to an electric brake booster for a vehicle brake system.

BACKGROUND ART

A vehicle generally comprises a hydraulic brake system for reducing down the speed of the vehicle and/or stopping the vehicle. Manipulating the brake pedal by the manual force of the driver is laborious, thus many vehicles are equipped with boosters in addition to the hydraulic-force transmitting mechanisms. A booster generally uses the vacuum in the inlet pipe of the engine as boost force source to increase the brake force of the hydraulic brake system.

The most common booster is the membrane type vacuum booster, which is mounted between the brake pedal and the primary brake cylinder of the hydraulic brake system and comprises a vacuum chamber and a working chamber which are separated in a housing by a membrane, the vacuum chamber being connected with the inlet pipe of the engine, the working chamber being in communication with the atmosphere via an air valve, and the vacuum chamber and the working chamber are connected with each other via a vacuum valve. In a rest state, the air valve is closed and the vacuum valve is opened so that the pressure in the vacuum chamber and the pressure in the working chamber are maintained as substantially the same. In a brake state, in response to a force applied to the brake pedal by the vehicle driver, the vacuum valve is closed and the air valve is opened, so that air is drawn into the working chamber. As a result, the pressure in the working chamber becomes higher than the pressure in the vacuum chamber. The membrane moves under the unbalance of pressure between the vacuum chamber and the working chamber, by means of which, a vacuum boost force which may be several times larger than the pedal force is applied to the primary brake cylinder. In this condition, the primary brake cylinder is subjected to the actions of both the pedal force and the vacuum boost force, so that the output pressure of the primary brake cylinder is increased, and the pedal force may be reduced.

It can be seen that the vacuum booster generates a vacuum boost force using the vacuum formed in the inlet pipe of the engine. When the engine is turned off, the vacuum of the inlet air will not exist, and no enough vacuum boost force will be able to be generated then.

SUMMARY OF THE INVENTION

An object of the invention is to solve some problems found in the conventional vacuum boosters, including complete depending on the vacuum in the inlet pipe of the engine, difficulties in the controlling of the actions of the brake booster, etc.

For this end, according to one aspect of the invention, there is provided an electric brake booster for a vehicle brake system, comprising: a push bar configured to be driven by a brake pedal to move forwards in an axial direction; a brake force outputting element configured to be pushed forwards by the push bar to output a brake force from the brake pedal; a booster force outputting element for outputting a booster force; a motor for driving the booster force outputting element to create the booster force; a poppet configured to be pushed forwards in the axial direction by the push bar with a spring force, wherein the poppet forms a boost switch, through which an electrical current can pass, with the brake force outputting element and forms a release switch, through which another electrical current can pass, with the booster force outputting element; and an electronic control unit for controlling the operation of the motor in response to the on-off states of the boost switch and the release switch.

According to a preferred embodiment of the invention, the booster force outputting element has an internal space extending in the axial direction, and the brake force outputting element is disposed in the internal space in a manner of being able to be moved relative to the booster force outputting element in the axial direction.

According to a preferred embodiment of the invention, the booster force outputting element and the brake force outputting element each have a back end facing towards the poppet in the axial direction, the release switch and the boost switch being formed respectively between the poppet and each of the back ends of the booster force outputting element and the brake force outputting element, wherein conductive contact is established between each of the back ends of the booster force outputting element and the brake force outputting element and the poppet when the electric brake booster is in a rest position.

According to a preferred embodiment of the invention, conductive contact is established between each of the back ends of the booster force outputting element and the brake force outputting element and the poppet when the electric brake booster is in a braking position.

According to a preferred embodiment of the invention, one of the back ends of the booster force outputting element and the brake force outputting element is out of contact with the poppet when the electric brake booster is in an intermediate position between the rest position and the braking position.

According to a preferred embodiment of the invention, the back ends of the booster force outputting element and the brake force outputting element are each provided with a conductive bump protruded towards the poppet; alternatively, the poppet is provided with conductive bumps protruded respectively towards the back ends of the booster force outputting element and the brake force outputting element.

According to a preferred embodiment of the invention, the electric brake booster further comprises a reaction disk disposed between the front ends of the booster force outputting element and the brake force outputting element and a main piston of a primary brake cylinder of the vehicle brake system, the boost force outputted from the booster force outputting element and the brake force outputted from the brake force outputting element are transmitted to the main piston through the reaction disk.

According to a preferred embodiment of the invention, the electric brake booster further comprises a returning spring which applies a returning force to the booster force outputting element, the returning force having a tendency of moving the booster force outputting element backwards in the axial direction.

According to a preferred embodiment of the invention, the motor is coupled to the booster force outputting element via speed reducing means. The motor may be a rotary DC motor or a linear DC motor.

According to the invention, a motor, in stead of the vacuum in the inlet pipe of the engine, is used as the boost force source, so that an advantageous option or substitution is provided to the boost force solutions of brake boosters.

Further, according to the invention, the structure of the brake booster itself forms a boost switch and a release switch which operate in combination to provide functions similar to the air valve and the vacuum valve in the traditional vacuum booster. The motor, the boost switch and the release switch are all coupled with an ECU (Electronic Control Unit) which determines the purpose of the braking action of the driver on the basis of electric signals from the boost switch and the release switch and then precisely controls the operation of the motor, so that the actions of the brake booster can be actively controlled precisely in real time.

DETAILED DESCRIPTION OF PREFERRED EMBODIMENTS

Some preferred embodiments of the invention will be described now with reference to the drawings.

Figure 1:
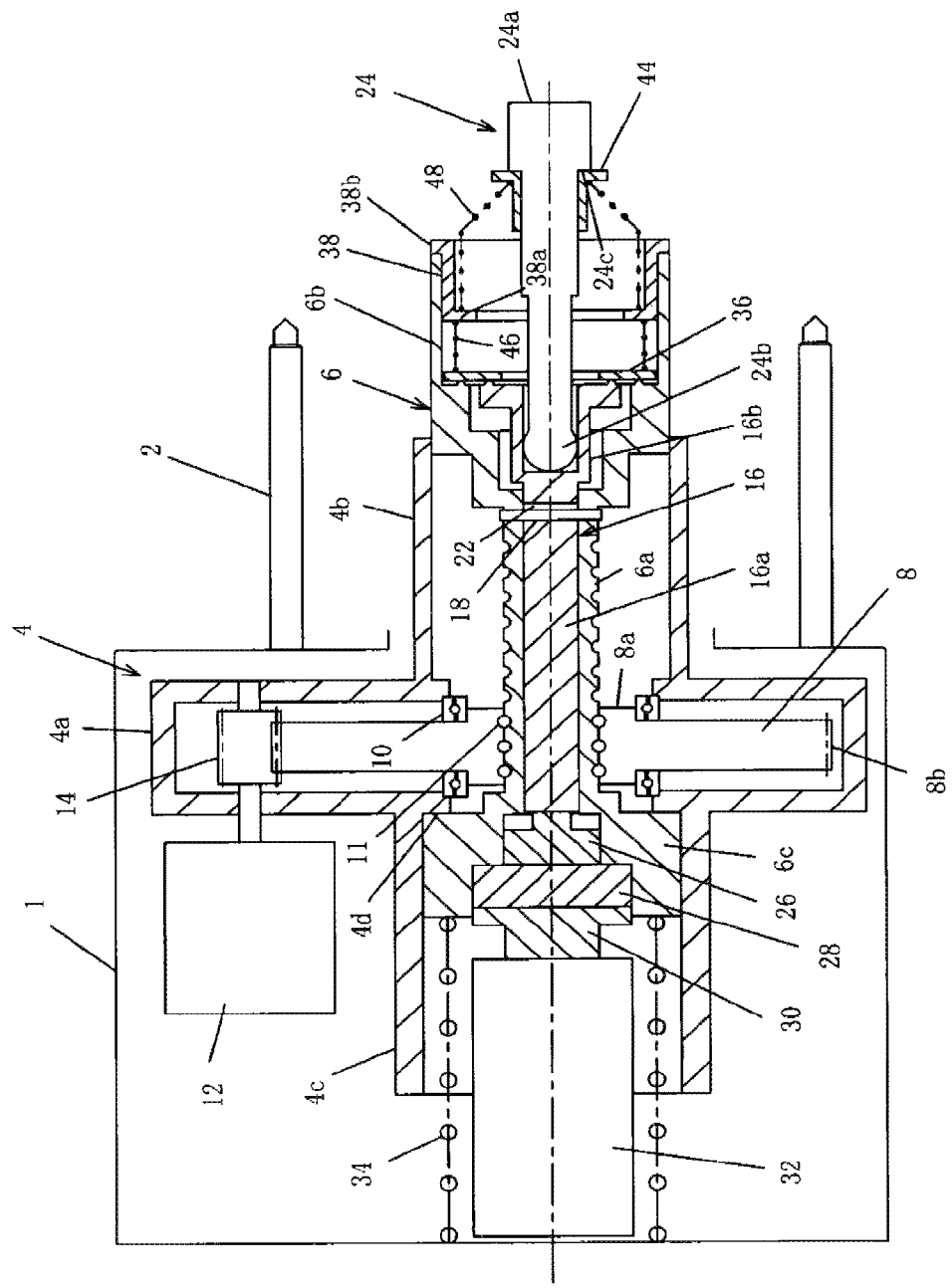
FIG. 1 is a sectional view of an electric brake booster for vehicle according to a preferred embodiment of the invention.

As shown in FIG. 1, an electric brake booster used in a vehicle brake system according to a preferred embodiment of the invention comprises a housing 1 which may be made of any suitable material, for example, formed by punching a sheet metal, like that in some traditional vacuum boosters.

The housing 1 may be fixed to the vehicle body by any suitable fastening elements, for example, fastening bars 2 shown in FIG. 1. Of course, other suitable fastening elements or structures may also be used for fixing the housing 1 to the vehicle body.

A carrier 4, which may be made of a metal or a high strength plastic material, is fixedly mounted in the housing 1. The carrier 4 mainly comprises three portions, i.e., a middle carrier portion 4a, a proximal carrier portion 4b extending towards the proximal side in the axial direction from a substantially center part of the middle carrier portion, and a distal carrier portion 4c extending towards the distal side in the axial direction from the substantially center part of the middle carrier portion. Said three portions may be formed integrally, or be formed separately and then assembled together.

The proximal carrier portion 4b and the distal carrier portion 4c are preferably in the form of cylinders disposed co axially, and the proximal carrier portion 4b and the distal carrier portion 4c comprise internal cavities which are configured to receive a valve body 6 therein, at least one of the internal cavities being provided with an element or structure, such as a guide pin, a guide slot or the like, for preventing the valve body 6 from relative rotating therein.

It is noted that, in the present disclosure, "proximal", "backwards" or similar expressions indicate the side near the brake pedal, while "distal" or "forwards" or similar expressions indicate the side away from the brake pedal or near the primary brake cylinder of the vehicle brake system.

Figure 2:
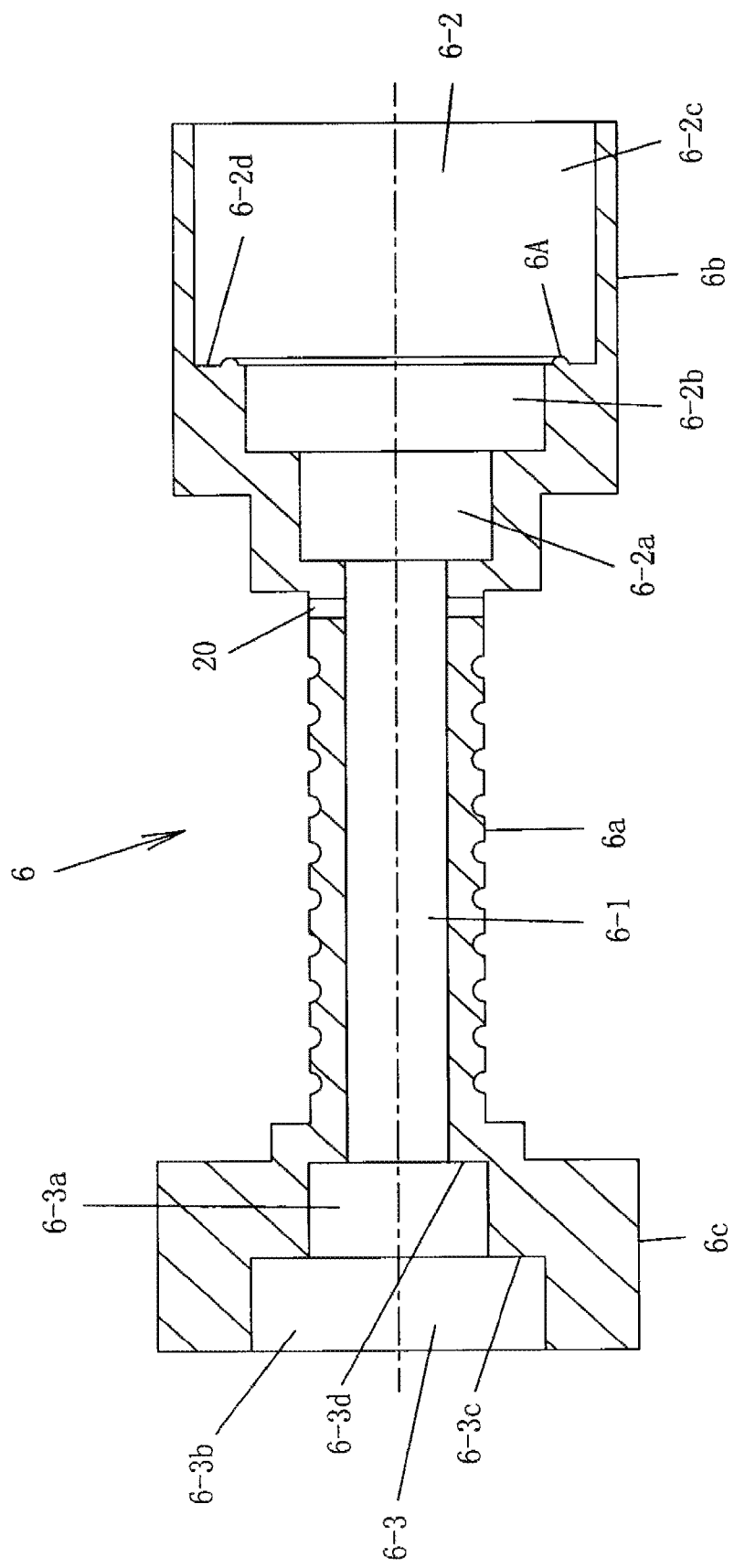
FIGS. 2 and 3 are enlarged schematic views of a valve body and a plunger used in the brake booster of the invention respectively.

The valve body 6, which functions as a booster force outputting element, is disposed in and carried by the proximal carrier portion 4b and the distal carrier portion 4c in a way of axially movable. The detailed structure of the valve body 6 is more clearly shown in FIG. 2.

In general, the valve body 6 comprises three portions in the axial direction, i.e., a middle driven portion 6a, a proximal sleeve portion 6b extending towards the proximal side from the proximal end of the middle driven portion in the axial direction, and a distal sleeve portion 6c extending towards the distal side from the distal end of the middle driven portion in the axial direction. Said three portions are formed therein with corresponding accommodating spaces 6-1, 6-2 and 6-3 which are in communication with one another in the axial direction. Further, said three portions may be formed integrally, or be formed separately and then assembled together.

The accommodating space 6-1 of the middle driven portion 6a has a substantially constant inner diameter.

The accommodating space 6-2 of the proximal sleeve portion 6b comprises a small diameter portion 6-2a, an intermediate portion 6-2b and a large diameter portion 6-2c from the distal side to the proximal side, having diameters increased in sequence. A shoulder 6-2d facing towards the proximal side is formed between the intermediate portion 6-2b and the large diameter portion 6-2c.

The accommodating space 6-3 of the distal sleeve portion 6c comprises a proximal small diameter portion 6-3a and a distal large diameter portion 6-3b. A shoulder 6-3c facing towards the distal side is formed between the proximal small diameter portion 6-3a and the distal large diameter portion 6-3b. The small diameter portion 6-3a is defined by an end surface 6-3d facing towards the distal side and a periphery wall extending towards the distal side from the end surface 6-3d. The large diameter portion 6-3b is defined by a plane in which the shoulder 6-3c lies and a periphery wall extending towards the distal side from this plane.

The proximal sleeve portion 6b is fitted in the proximal carrier portion 4b and is slidable in the proximal carrier portion 4b in the axial direction. The distal sleeve portion 6c is fitted in the distal carrier portion 4c and is slidable in the distal carrier portion 4c in the axial direction. In this way, the valve body 6 as a whole is able to be moved in the carrier 4 in the axial direction.

Further, the valve body 6 is not able to be rotated around its central axis in the carrier 4. For this end, a guiding element (not shown), such as a key, a guiding pin and the like may be provided between the proximal sleeve portion 6b and the proximal carrier portion 4b and/or be provided between the distal sleeve portion 6c and the distal carrier portion 4c.

The middle driven portion 6a is the part where the valve body 6 is driven to move axially. In the example shown in FIG. 1, the middle driven portion 6a is in the form of a ball screw, that is, the outer surface of the middle driven portion 6a is formed with a helical raceway. A gear 8 is carried by the middle driven portion 6a and has a radially inner sleeve part 8a and a radially outer gear part 8b. The central axis of the gear 8 is collinear with the central axis of the middle driven portion 6a.

The gear 8 is mounted in the middle carrier portion 4a by axially opposite bearings 10 (for example, thrust bearings) so that the gear 8 is rotatable around its central axis but is not movable in the axial direction.

Bearing balls 11 are carried by the sleeve part 8a on its inner periphery and are received in the raceway of the middle driven portion 6a. In this way, the gear 8, when driven to rotate, is able to drive the middle driven portion 6a to move axially, and thus the valve body 6 is moved in the axial direction relative to the carrier 4.

The gear 8 is provided with rotational power by a rotary motor 12, which is mounted in the housing 1 and has an output shaft carrying a pinion 14. The pinion 14 is disposed in the middle carrier portion 4a and engages with the outer gear part 8b of the gear 8.

The motor 12 may be a brushless DC motor widely used in vehicles. The motor 12 may be powered by the vehicle battery. The motor 12 is connected with and controlled by an ECU (not shown).

The transmission ratio of the pinion 14 to the gear 8 and that of the gear 8 to the middle driven portion 6a are selected so that the middle driven portion 6a may obtain a proper axial speed when the motor 12 is activated. In the condition that the transmission ratio of the pinion 14 to the gear 8 engaged directly therewith as shown in FIG. 1 is not high enough, one or more additional transmission gears may be provided between the pinion 14 and the gear 8.

It is appreciated that the configuration for driving the middle driven portion 6a to move axially as shown in FIG. 1 is only illustrative, not restrictive. Various suitable manners for driving the middle driven portion 6a to move axially by the motor are conceivable to those skilled in the art based on the spirits and concepts disclosed by the invention. For example, the driving mechanism between the gear 8 and the middle driven portion 6a may be substituted by a worm-gear type, a gear-rack type and the like.

Further, the rotary motor 12 illustrated here may be substituted by a linear motor, which may be kinematically coupled to the middle driven portion 6a by a lever type transmission and thus drives the middle driven portion 6a to move axially.

Furthermore, it is appreciated that the motor 12 may drive the valve body 6 at any portion thereof, rather than limited to the middle driven portion 6a. For example, it is possible that the motor 12 drives the proximal sleeve portion 6b or the distal sleeve portion 6c to move axially.

Thus, it is appreciated that any manners of driving the valve body 6 to move axially relative to the carrier 4 by the motor fall within the scope of protection of the invention.

Figure 3:
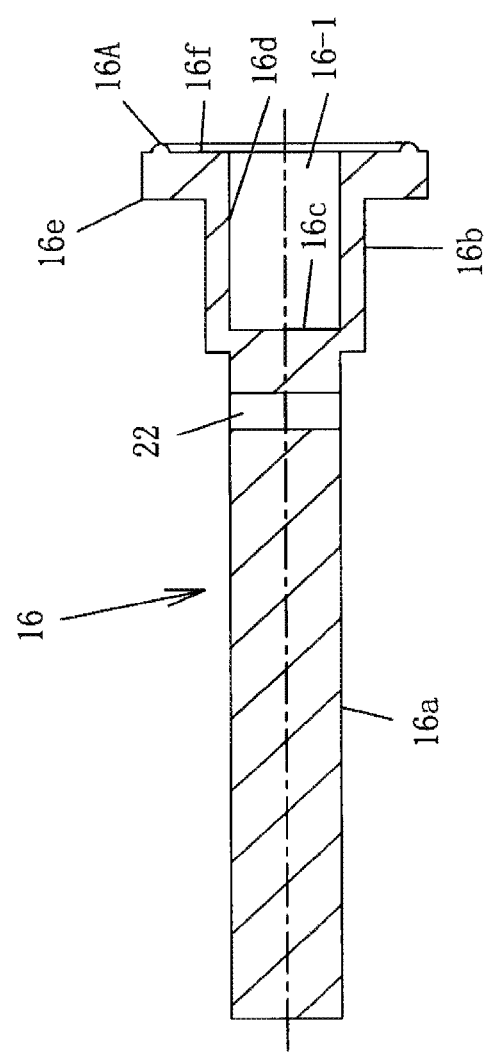

A plunger 16, which functions as a brake force outputting element, is disposed in the valve body 6. The detailed structure of the plunger 16 is more clearly shown in FIG. 3.

The plunger 16 comprises a shaft portion 16a extending in the axial direction and an enlarged portion 16b extending towards proximal side from the proximal end of the shaft portion. The proximal end of the enlarged portion 16b is formed with a flange portion 16e protruding outwards radially. The flange portion 16e defines an end surface 16f of the plunger 16 which faces the proximal side.

The shaft portion 16a is inserted into the axial accommodating space 6-1 of the middle driven portion 6a. A radial locating hole 20 is formed through the middle driven portion 6a, and a corresponding radial through hole 22 is formed through the shaft portion 16a. A locating pin 18 is inserted through the through hole 22 and is fixed into the locating hole 20. The through hole 22 has a dimension in the axial direction slightly larger than the locating hole 20, so that the shaft portion 16a is able to move a small axial distance in the axial direction relative to the middle driven portion 6a. This axial distance is substantially equal to the difference between the axial dimensions of the through hole 22 and the locating hole 20.

By providing the locating pin 18 and said difference between the axial dimensions, the plunger 16 is allowed to move axially in synchronization with the valve body 6 after the plunger 16 has been moved by a small axial distance in the axial direction.

An accommodating space 16-1 is formed in the enlarged portion 16b. The accommodating space 16-1 is defined by an end wall 16c facing towards the proximal side and a periphery wall 16d extending towards the proximal side from the end wall.

A portion of a push bar 24 is received in the accommodating space 16-1, the push bar 24 being driven by the brake pedal (not shown). The push bar 24 extends in the axial direction and has a central axis collinear with the central axis of the plunger 16. The push bar 24 comprises a middle bar portion, a proximal end 24a having an enlarged diameter and a distal end 24b in the form of a ball. The proximal end 24a defines a shoulder 24c facing towards the distal side.

The proximal end 24a of the push bar 24 is configured to be driven by the brake pedal, so that the push bar 24 moves towards the distal side in the axial direction. The ball shaped distal end 24b of the push bar 24 is received in the accommodating space 16-1 of the enlarged portion 16b and pushes against the end wall 16c, which defines the accommodating space 16-1, in a direction towards the distal side.

The distal end of the shaft portion 16a extends to an axial position near the end surface 6-3d of the distal sleeve portion 6c. A reaction disk 28 is disposed in the accommodating space 6-3 of the distal sleeve portion 6c, and a plunger plate 26 is disposed in the small diameter portion 6-3a. The plunger plate 26 is clamped in the axial direction between an inner portion of the proximal side surface of the reaction disk 28 and the distal end of the shaft portion 16a. An outer periphery portion of the proximal side surface of the reaction disk 28 is pushed against by the shoulder 6-3c in the direction towards the distal side.

The distal side surface of the reaction disk 28 biases against a push rod 30 in the direction towards the distal side. An axially distal end of the push rod 30 is coupled with a main piston 32 of the primary brake cylinder of the vehicle brake system.

The reaction disk 28 is preferably elastic, for example, made of rubber having elasticity.

The brake booster further comprises a returning spring 34 having a proximal end biasing against the distal end surface of the distal sleeve portion 6c in a direction towards the proximal side, and a distal end fixed in the housing 1. In a rest position (non-braking position) of the brake booster as shown in FIG. 1, the returning spring 34 pushes the distal sleeve portion 6c in the direction towards the proximal side, so that the proximal end surface of the distal sleeve portion 6c biases against a stop portion 4d formed or arranged in the carrier 4, where the home position (the right most position in FIG. 1) of the valve body 6 is defined. Now the plunger 16 is pushed by the main piston 32 via the push rod 30, the reaction disk 28 and the plunger plate 26 in the direction towards the proximal side, so that the plunger 16 is also in its home position.

It is appreciated that, as an substitution or addition to the returning spring 34 which biases the valve body 6 so that it has a tendency of returning back to and being kept in its home position, the outer periphery portion of the reaction disk 28 may push in the axial direction against the shoulder 6-3c of the distal sleeve portion 6c so that the valve body 6 tends to be returned back to and then be kept in its home position.

A poppet 36 is disposed in the proximal sleeve portion 6b of the valve body 6. The poppet 36 is in the form of a substantially circular disk and has a central through hole which is inserted through by the middle bar portion of the push bar 24. In the rest position of the brake booster shown in FIG. 1, the proximal end surface 16f of the plunger 16 and the shoulder 6-2d in the proximal sleeve portion 6b of the valve body 6 have substantially the same axial position, and the poppet 36 is biased in the direction towards the distal side against at least one of the proximal end surface 16f of the plunger 16 and the shoulder 6-2d in the proximal sleeve portion 6b of the valve body 6 by biasing means arranged between the poppet 36 and the push bar 24.

In the example shown in FIG. 1, the biasing means arranged between the poppet 36 and the push bar 24 comprises an inserted tube 38 slidably disposed in the proximal sleeve portion 6b at an axial position which is more proximal than that of the poppet 36, the inserted tube 38 comprising a distal end inward flange 38a and a proximal end outward flange 38b. When the proximal end outward flange 38b biases against the proximal end of the proximal sleeve portion 6b, the inserted tube 38 is prevented from further moving in the direction towards the distal side relative to the proximal sleeve portion 6b. The biasing means further comprises a sleeve 44 mounted to the middle bar portion of the push bar 24 and being configured to bias against the shoulder 24c of the push bar 24, the proximal end of the sleeve 44 being provided with an outward flange, a first compression spring 46 compressed between the poppet 36 and the distal end surface of the inserted tube 38, and a second compression spring 48 compressed between the distal end inward flange 38a of the inserted tube 38 and the proximal end outward flange of the sleeve 44.

The second compression spring 48 has a pushing force higher than that of the first compression spring 46. By means of the biasing means comprising the two compression springs, and in combination of the action of the locating pin 18, positional relation between the valve body 6 and the plunger 16 is set.

The brake booster may comprise a sealing shield sleeve (not shown), for example, a rubber shield sleeve, for protecting the functional components of the brake booster.

Figure 4:
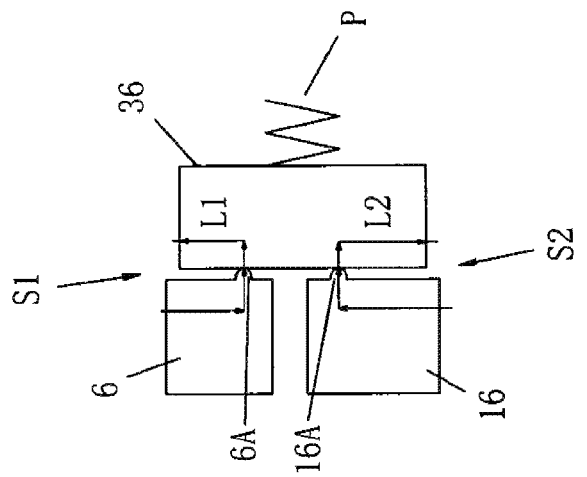
FIG. 4 is a schematic view of a boost switch and a release switch used in the brake booster of the invention.

According to an important aspect of the invention, electric circuit paths L1 and L2 are formed between the poppet 36 and the two of the valve body 6 and the plunger 16 respectively, with reference to FIG. 4. The ECU determines the braking purpose of the driver according to the on-off states of the two electric circuit paths. For this reason, the poppet 36 is made of a conductive material, for example, metal, and the valve body 6 and the plunger 16 are made of a conductive material, for example, metal at least in the portions of them to be in contact with the poppet 36 to form the electric circuit paths.

As describe above, in the rest position of the brake booster shown in FIG. 1, the proximal end surface 16f of the plunger 16 and the shoulder 6-2d in the proximal sleeve portion 6b of the valve body 6 are both in contact with the poppet 36. Now, as shown in FIG. 4, the poppet 36 is pushed against by the biasing means (here illustrated schematically and represented by "P") in the direction towards the distal side, and the electric circuit path L1 between the valve body 6 and the poppet 36 and the electric circuit path L2 between the plunger 16 and the poppet 36 are all in "on" state.

For increasing the reliability of the contact between the poppet 36 and the two of the valve body 6 and the plunger 16, a protrusion 6A (with reference to FIG. 2, etc.) protruding towards the poppet 36 is formed on the shoulder 6-2d in the proximal sleeve portion 6b of the valve body 6, and a protrusion 16A (with reference to FIG. 3, etc.) protruding towards the poppet 36 is formed on the proximal end surface 16f of the plunger 16. The protrusions 6A and 16A may each be in the form of a ring or be formed by discrete points of arc segments.

Alternatively, the distal side surface of the poppet 36 may be formed with protrusions protruding towards the valve body 6 and the plunger 16 respectively, by means of which, the reliability of the contact between the poppet 36 and the two of the valve body 6 and the plunger 16 can also be increased.

As shown in FIG. 4, the electric circuit path L1 flows through the protrusion 6A from the valve body 6 to the outer periphery of the poppet 36 in the directions shown by corresponding arrows, and the electric circuit path L2 flows through the protrusion 16A from the plunger 16 to the inner periphery of the poppet 36 in the directions shown by corresponding arrows. The inner and outer peripheries of the poppet 36 may be electrically separated from each other by an insulative material.

Thus, it can be considered that an electric circuit switch (referred to here as release switch S1) is formed between the valve body 6 and the poppet 36, and another electric circuit switch (referred to here as boost switch S2) is formed between the plunger 16 and the poppet 36. The ECU can determine the on-off states of the electric circuit paths L1 and L2, or the on-off states of the two electric circuit switches, by measuring whether there is an electric current in each of the electric circuit paths L1 and L2. Then, the ECU can determine the braking purpose of the driver.

Figure 5:
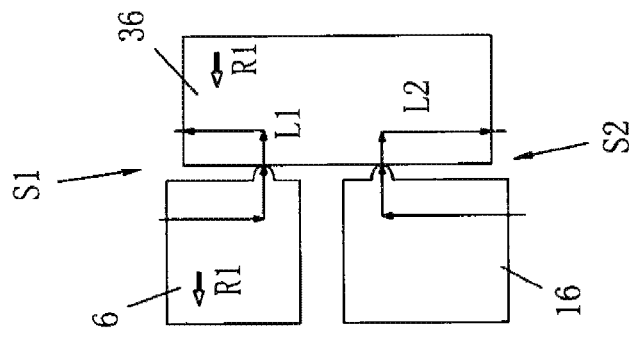
FIGS. 5 to 7 are schematic views of the boost switch and the release switch of the electric brake booster for vehicle according to the invention in a braking mode respectively.
Figure 6:
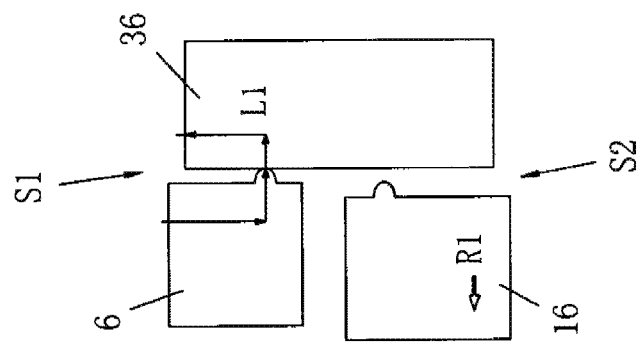
Figure 7:
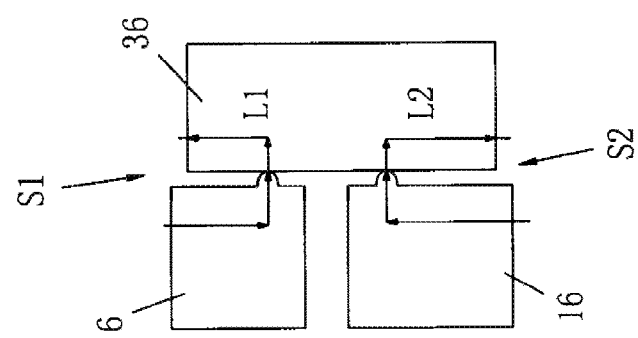
Figure 10:
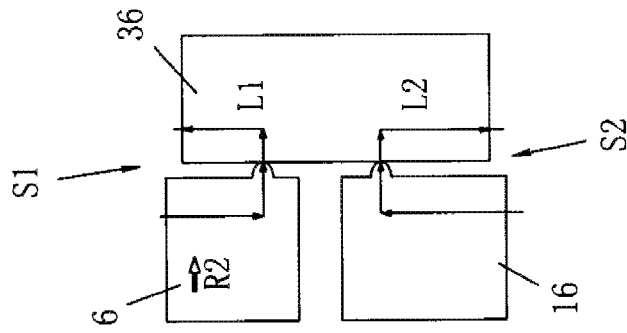
FIGS. 8-10 are schematic views of the boost switch and the release switch of the electric brake booster for vehicle according to the invention in a brake releasing mode respectively.
Figure 9:
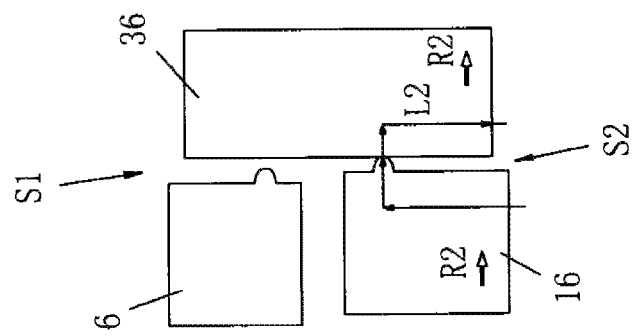
Figure 8:
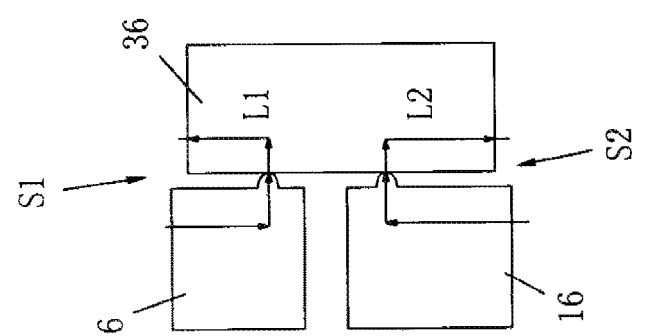

FIGS. 5 to 7 show the actions and on-off states of the boost switch and the release switch of the brake booster according to the invention in a braking mode, and FIGS. 8 to 10 show the actions and on-off states of the boost switch and the release switch of the brake booster according to the invention in a brake releasing (un-braking) mode.

Now the braking operations of the brake booster according to the invention will be described with reference to FIG. 1 and FIGS. 5 to 7.

As shown in FIG. 1, the brake booster is in the rest position, i.e., the driver does not press down the brake pedal. Now, as shown in FIG. 5, the valve body 6 and the plunger 16 are both in contact with the poppet 36, and the release switch S1 and the boost switch S2 in the electric circuit paths L1 and L2 are both in an "on" state. The ECU determines the states of the two switches by detecting the electric currents flowing through the electric circuit paths L1 and L2.

Next, the driver presses down the brake pedal to perform braking of the vehicle. Pressing down the brake pedal results in that the push bar 24 moves towards the distal side in the axial direction against the pushing force of the second compression spring 48. The distal end 24b of the push bar 24 pushes the plunger 16 to move towards the distal side, and the distal end of the plunger 16 pushes against the inner portion of the reaction disk 28 in the direction towards the distal side via the plunger plate 26, so that the inner portion of the reaction disk 28 pushes the main piston 32 of the primary brake cylinder towards the distal side via the push rod 30. In this way, the manual brake force applied by the driver is transmitted to the main piston 32.

In the initial stage when the plunger 16 moves towards the distal side, the valve body 6 remains stationary in the axial direction under the biasing action of the returning spring 34 towards the proximal side. In this stage, i.e., when the brake booster is in an intermediate position in a transition stage from its rest position to its braking position, as shown in FIG. 6, the valve body 6 keeps in contact with the poppet 36, so that the release switch S1 keeps its "on" state, thus there is an electric current flowing through the electric circuit path L1. On the other hand, the plunger 16 moves towards the distal side in the direction of arrow R1, and is thus away from and out of contact with the poppet 36. In this condition, the boost switch S2 is turned off, and thus the electric current flowing through the electric circuit path L2 disappears. The ECU detects the change in the switch states, that is, the condition where the release switch S1 and the boost switch S2 are both in "on" state is changed to a condition where the release switch S1 is in "on" state while the boost switch S2 is in "off" state, so that the ECU determines the braking action of the driver.

Then, the ECU activates the motor 12 to run in a forward direction, and the forward rotation of the motor 12 is transmitted to the screw type middle driven portion 6a of the valve body 6 via the pinion 14 and the gear 8, so that the valve body 6 is moved towards the distal side against the pushing force of the returning spring 34. The shoulder 6-3c in the distal sleeve portion 6c of the valve body 6 pushes against the outer periphery portion of the reaction disk 28 in the direction towards the distal side, so that the outer periphery portion of the reaction disk 28 pushes the main piston 32 of the primary brake cylinder towards the distal side via the push rod 30. In this manner, the boost force provided by the motor 12 is transmitted to the main piston 32.

Under the action of both the manual brake force provided by the driver and the boost force provided by the motor, the main piston 32 forces the brake liquid in the primary brake cylinder towards the brake devices equipped to corresponding wheels of the vehicle to perform braking to the vehicle. Now, the brake booster is in the braking position.

When the valve body 6 moves towards the distal side, the biasing means between the poppet 36 and the push bar 24 forces the poppet 36 to move towards the distal side in the direction of arrow R1 along with the valve body 6, as shown in FIG. 7, and ultimately the poppet 36 comes into contact with both the valve body 6 and the plunger 16 again. In this way, the release switch S1 and the boost switch S2 reach the states shown in FIG. 7, i.e., they are both in "on" state. The ECU determines the continuation of the braking action, and thus controls the motor 12 to rotate forwards; alternatively, the ECU controls the motor 12 to rotate forwards in a period of time and then stops the motor 12, to wait the end of the braking action.

Then the brake releasing operation of the brake booster according to the invention will be describe with reference to FIG. 1 and FIGS. 8 to 10.

In the continuation state of the braking action, as shown in FIG. 8, the release switch S1 and the boost switch S2 are both in "on" state.

When the braking action is to be ended, the driver releases the brake pedal. The hydraulic force in the primary brake cylinder applied to the main piston 32 is transmitted to the plunger 16 via the push rod 30, the inner portion of the reaction disk 28 and the plunger plate 26 in the direction towards the proximal side, so that the plunger 16 is moved back to its home position shown in FIG. 1 in the direction towards the proximal side. Meanwhile, the poppet 36 is moved back to its home position shown in FIG. 1 in the direction towards the proximal side by biasing means disposed between the poppet 36 and the push bar 24. In the initial stage of the brake releasing operation, i.e., when the brake booster is in a returning intermediate position in a transition stage from its braking position to its rest position, as shown in FIG. 9, the plunger 16 and the poppet 36 are both moved towards the proximal side in the direction of arrow R2 as illustrated. Under the action of the first compression spring 46, the plunger 16 and the poppet 36 keep in contact with each other, while the valve body 6 is stationary in the axial direction and is thus away from and out of contact with the poppet 36. In this way, the release switch S1 is turned off. The ECU detects the change in the switch states, that is, the condition where the release switch S1 and the boost switch S2 are both in "on" state is changed to a condition where the boost switch S2 is in "on" state while the release switch S1 is in "off" state, so that the ECU determines that the driver is ending the braking action.

Then, the ECU activates the motor 12 to run in a backward direction, and the backward rotation of the motor 12 is transmitted to the screw type middle driven portion 6a of the valve body 6 via the pinion 14 and the gear 8, so that the valve body 6 is moved towards the proximal side. The pushing forces of the returning spring 34 and the outer periphery portion of the reaction disk 28 force the valve body 6 to move towards the proximal side. As shown in FIG. 10, by the movement of the valve body 6 towards the proximal side in the direction of arrow R2, the valve body 6 ultimately comes into contact with the poppet 36 again, so that the condition of the switch states change to the condition in which both the release switch S1 and the boost switch S2 are in "on" state. The ECU determines the finish of the brake releasing (ending) action and then stops the backward rotation of the motor 12.

It is noted that, if the pushing force of the returning spring 34 is high enough, and in the mean time there is no self-lock between the bearing balls in the sleeve part 8a of the gear 8 and helical raceway of the middle driven portion 6a, or in other words, the valve body 6 when moved axially can drive the gear 8 to rotate, the valve body 6 may return to its home position in the direction towards the proximal side only by means of the pushing force of the returning spring 34, without needing the active backward rotation of the motor 12.

No matter it is in the braking operation or in the brake releasing operation, the plunger 16 is firstly moved by a small distance relative to the valve body 6 in the axial direction first. By means of adopting the locating pin 18 and the dimensional difference between the through hole 22 and the locating hole 20, the first moving of the plunger 16 becomes possible.

It can be seen that, according to the invention, the motor 12 is used as the boost force source as a substitution to the solution of the prior art where the vacuum in the inlet pipe of the engine is used as the boost force source. Thus, the brake booster of the invention provides a possibility that the brake booster can provide the boost force by the motor even after the engine has been turned off, which contributes to improvements in the driving comfortability and safety of the vehicle.

At this point, it should be noted that, whether it needs to use the electric brake booster of the invention in assistant in the vehicle braking after the engine has been turned off depends on the power management of the whole vehicle.

Anyway, the present disclosure provides the possibility of providing the boost force after the engine has been turned off.

Further, according to the invention, the release switch S1 and the boost switch S2 are formed by the structure of the brake booster itself, i.e., the poppet 36 and the two of the valve body 6 and the plunger 16, and the switch states of the two switches in combination are substantially corresponding to the air valve and the vacuum valve of the traditional vacuum booster. The motor 12, the release switch S1 and the boost switch S2 are all connected with the ECU which determines the purpose of the braking action of the driver on the basis of the electric signals from the boost switch and the release switch and then actively and precisely controls the operation timing, direction of rotation, speed and other parameters of the motor, thus the action of the brake booster can be controlled precisely in real time. Further, no stroke sensor or rotation sensor is needed in the invention. Thus, the brake booster of the invention can be considered as an intelligent brake booster.

While certain embodiments have been described here, the detailed structures of these embodiments are presented by way of example only and are not intended to limit the scope of the inventions. The attached claims and their equivalents are intended to cover all the modifications, substitutions and changes as would fall within the scope and spirit of the invention.

The invention claimed is:

1. An electric brake booster for a vehicle brake system, comprising:
    a push bar configured to be driven by a brake pedal to move forwards in an axial direction;
    a brake force outputting element configured to be pushed forwards by the push bar to output a brake force from the brake pedal;
    a booster force outputting element configured to output a booster force;
    a motor configured to drive the booster force outputting element to create the booster force;
    a poppet configured to be pushed forwards in the axial direction by the push bar with a spring force, wherein the poppet forms a boost switch, through which an electrical current is configured to pass, with the brake force outputting element and forms a release switch, through which another electrical current is configured to pass, with the booster force outputting element; and
    an electronic control unit configured to control the operation of the motor in response to the on-off states of the boost switch and the release switch.

2. The electric brake booster of claim 1, wherein the booster force outputting element has an internal space extending in the axial direction, and the brake force outputting element is disposed in the internal space and configured to be moved relative to the booster force outputting element in the axial direction.

3. The electric brake booster of claim 2, wherein the booster force outputting element and the brake force outputting element each have a back end facing towards the poppet in the axial direction, the release switch and the boost switch being formed between the back ends of the booster force outputting element and the brake force outputting element and the poppet respectively, and wherein conductive contact is established between each of the back ends of the booster force outputting element and the brake force outputting element and the poppet when the electric brake booster is in a rest position.

4. The electric brake booster of claim 3, wherein conductive contact is established between each of the back ends of the booster force outputting element and the brake force outputting element and the poppet when the electric brake booster is in a braking position.

5. The electric brake booster of claim 4, wherein one of the back ends of the booster force outputting element and the brake force outputting element is out of contact with the poppet when the electric brake booster is in an intermediate position between the rest position and the braking position.

6. The electric brake booster of claim 3, wherein:
    the back ends of the booster force outputting element and the brake force outputting element are each configured with a conductive bump protruded towards the poppet; or
    the poppet is configured with conductive bumps protruded towards the back ends of the booster force outputting element and the brake force outputting element respectively.

7. The electric brake booster of claim 1, further comprising a reaction disk disposed between the front ends of the booster force outputting element and the brake force outputting element and a main piston of a primary brake cylinder of the vehicle brake system, wherein the boost force outputted from the booster force outputting element and the brake force outputted from the brake force outputting element are transmitted to the main piston through the reaction disk.

8. The electric brake booster of claim 1, further comprising a returning spring configured to apply a returning force to the booster force outputting element, the returning force having a tendency of moving the booster force outputting element backwards in the axial direction.

9. The electric brake booster of claim 1, wherein the motor is coupled to the booster force outputting element via a speed reducing device.

10. The electric brake booster of claim 9, wherein the motor is a rotary DC motor or a linear DC motor.

* * * * *